(12) United States Patent
Belte

(10) Patent No.: US 11,288,911 B2
(45) Date of Patent: Mar. 29, 2022

(54) DEVICE FOR SELLING GOODS, SYSTEM COMPRISING SUCH A DEVICE AND METHOD FOR OPERATING SUCH A DEVICE

(71) Applicant: LATEBIRD GmbH, Paderborn (DE)

(72) Inventor: Markus Belte, Grünwald (DE)

(73) Assignee: LATEBIRD GmbH, Paderborn (DE)

( * ) Notice: Subject to any disclaimer, the term of this patent is extended or adjusted under 35 U.S.C. 154(b) by 0 days.

(21) Appl. No.: 16/962,499

(22) PCT Filed: Jan. 16, 2019

(86) PCT No.: PCT/EP2019/051067
§ 371 (c)(1),
(2) Date: Jul. 15, 2020

(87) PCT Pub. No.: WO2019/141736
PCT Pub. Date: Jul. 25, 2019

(65) Prior Publication Data
US 2020/0349794 A1    Nov. 5, 2020

(30) Foreign Application Priority Data

Jan. 16, 2018 (DE) .................... 10 2018 100 867.8

(51) Int. Cl.
*G07F 9/00* (2006.01)
*G07F 9/10* (2006.01)
(Continued)

(52) U.S. Cl.
CPC ............. *G07F 9/105* (2013.01); *G07F 9/001* (2020.05); *G07F 9/002* (2020.05); *G07F 11/165* (2013.01); *G07F 11/1653* (2020.05); *G06Q 20/18* (2013.01)

(58) Field of Classification Search
CPC ............................... G07F 9/105; G07F 11/165
See application file for complete search history.

(56) References Cited

U.S. PATENT DOCUMENTS 6,962,267 B2    11/2005   Herzog et al.
7,802,700 B2 *   9/2010   Ardern .................. G07F 11/165
                                                       221/258
(Continued)

FOREIGN PATENT DOCUMENTS

DE         102014100321 A1     7/2015

OTHER PUBLICATIONS

PCT/EP2019/051067 English translation of International Search Report and Written Opinion dated Apr. 30, 2019, 8 pages.

*Primary Examiner* — Gene O Crawford
*Assistant Examiner* — Ayodeji T Ojofeitimi
(74) *Attorney, Agent, or Firm* — Lathrop GPM LLP

(57) ABSTRACT

The invention relates to a device (100) for the sale of goods (161), having at least two storage areas (111, 112), in each of which a temperature different from the other storage areas can be set and/or adjusted in a respectively associated temperature range, and which are each arranged for the storage of goods (161), having an automated handling system (120), by means of which goods (161) can be removed from each of the storage areas (111, 112), and having a output device (130) in which goods (161) can be provided for removal, the device (100) being arranged to remove selected goods (161) from the storage areas (111, 112) by means of the handling system (120) and, after a release, to provide them for removal in the output device (130), a system having at least one such device and a method for operating such a device (100).

19 Claims, 7 Drawing Sheets

(51) Int. Cl.
*G07F 11/16* (2006.01)
*G06Q 20/18* (2012.01)

(56) References Cited

U.S. PATENT DOCUMENTS

| | | |
|---|---|---|
| 2005/0143857 A1 | 6/2005 | Chirnomas |
| 2009/0179042 A1* | 7/2009 | Milan .................... G07F 11/08 221/150 R |
| 2011/0238210 A1* | 9/2011 | Roekens ............. G07F 17/0071 700/240 |
| 2015/0058178 A1 | 2/2015 | Chirnomas |
| 2015/0291357 A1 | 10/2015 | Razumov |
| 2016/0063604 A1 | 3/2016 | Shaffer |
| 2016/0379287 A1* | 12/2016 | Dabiri ................... G06Q 40/02 705/26.43 |
| 2017/0036859 A1 | 2/2017 | Lopes |

\* cited by examiner

DEVICE FOR SELLING GOODS, SYSTEM COMPRISING SUCH A DEVICE AND METHOD FOR OPERATING SUCH A DEVICE

The present invention is related to a device for selling goods, a system comprising at least one such device and a method for operating such a device.

PRIOR ART

There are vending machines for selling goods outside the opening hours of supermarkets and the like. In such vending machines, certain goods are kept in stock, from which a desired product can be selected using an input means on the vending machine. After payment, these goods are then released. Normally, a corresponding compartment containing the goods in question is then released to that end.

There are also vending machines that are provided with a handling device with which the selected goods can be taken to a special dispenser. One of the disadvantages of such vending machines is that only certain types of products can be sold only individually, which makes it practically impossible to purchase many different products.

From U.S. Pat. No. 6,962,267 B2 a vending machine is known in which not only goods of different sizes can be kept in stock, but in which also several different products can be removed together by means of an appropriate handling device and brought to an output compartment.

However, such vending machines still have the disadvantage that only certain goods can be sold with them. DE 10 2014 100 321 A1, for example, provides a storage system with refrigerated compartments that can be opened individually. In such a compartment, an employee can store goods previously selected by the customer according to his or her wishes. However, the disadvantage here is that once the goods have been selected, an employee must first take action.

Against this background, the task is therefore to provide a way to sell as many different goods as possible and to do so as independently of sales staff as possible.

DISCLOSURE OF THE INVENTION

According to the invention, a device, a system and a method with the features of the independent claims are proposed. Advantageous embodiments are the subject of the sub-claims and the following description.

A device according to the invention serves for the sale of goods and has at least two storage areas, in each of which a temperature different from the other storage areas can be set and/or adjusted in a respectively associated temperature range, and which are each arranged for the storage of goods. At least three storage areas are particularly preferred, and even more storage areas are conceivable, for example four or five. In addition, the device has an automated handling system, by means of which goods can be removed from each of the storage areas, as well as an output device, in which goods can be provided for removal. Overall, the device is designed to remove selected goods from the storage areas by means of the handling system and, after a release (grant of a release), to provide them for removal in the output device.

Thanks to the at least two storage areas with different temperatures, it is now possible to keep not only certain types of goods in the device, but all kinds of types of goods. In particular, this also includes food. In particular, the device is also arranged to maintain the respective temperatures in the storage areas permanently—at least within a certain range. For this purpose, the storage areas may be assigned temperature ranges from −30° C. to 0° C., in particular from −24° C. to −16° C., and/or from 0° C. to 10° C., in particular from +2° C. to +10° C., and/or having ambient temperature or from +10° C. to +25° C., in particular from +15° to +22° C., within which the corresponding temperatures can be set or adjusted. In the case of the ambient temperature, an adjustment is generally not necessary.

This means that at least two, and in particular three, different climate zones can be created, for example for frozen foods, for fresh foods and for other goods or food which do not require special cooling. In order to be able to maintain the appropriate temperatures and also to enable goods to be removed from the corresponding storage area, suitable measures can be taken, as will be explained in more detail later. As already mentioned, the device is arranged to take goods from each of the at least two storage areas or from each of the at least two climate zones and thus to pick them. However, it goes without saying that goods do not have to be removed from each storage area during every process, for example if only frozen food is to be dispensed.

By bringing the selected goods to the output device, it is also possible to dispense or sell goods without sales staff—apart from refilling. This allows for temporally flexible or unlimited sales, in particular many different goods can be obtained at any time of the day.

Since the device is also arranged to provide the selected goods for removal only after they have been released, it is also guaranteed that goods cannot be removed without authorization, for example without payment.

Preferably the device also has a selection device, in particular with a display and/or input means, by means of which the goods to be removed from the storage areas can be selected. This could be, for example, a touch screen on which a user is shown available goods, i.e. goods currently present in the device or in the storage areas, and which the user can then select as desired. The goods selected by the user in this way can then, as mentioned, be brought to the output device by means of the handling system.

Preferably, a payment device is also provided, by means of which the selected goods can be paid for, wherein the device is arranged in particular to only grant release after payment has been made. The payment device can be arranged for payment by EC card or credit card and/or cash. However, other possibilities are also conceivable, such as payment by NFC chip or the like. Attention is further drawn to the following explanations. This makes it possible for a customer to pay for his selected goods on site at the device and then receive them. In this context it is particularly advantageous if the release is only given after payment has been made.

It is particularly preferred if the device is also arranged to receive information about selected goods to be removed from the storage areas via a data link. In particular, the device can then further be arranged to block the goods to be removed in accordance with the information received via the data link from a further selection. This makes it possible to select the goods in the device using a computing unit that is remote from the device, for example. This can be done by a customer or user, for example from home or on the road, who can then receive the goods at the device later, especially only at a later time.

A computer or PC or, in particular, a mobile phone or smartphone can be used as computing unit. For example, this can be a corresponding software or application, for example a so-called app, or a suitable website to be opened in a browser. In order to process the corresponding information from the computing unit, a suitable computing unit can also be provided for the device. This can be provided in the device itself, but it is also conceivable that a central computing unit is provided for several such devices, as will be explained in more detail later.

In this context, it is also particularly expedient if the selected goods are blocked—and thus reserved—from a further selection, for example by another customer or user. In such a case, it is also expedient to grant release only after authentication, in particular by means of a code. This ensures that only the customer in question receives the goods reserved for him. Such a code or other means of authentication can be transmitted to the customer, for example to the computing unit. In the case of a numerical code, such a code can be entered, for example, at the device on a keypad. However, it is also conceivable and particularly practical to scan, for example, a barcode or QR code from a display of a mobile phone using a corresponding reader.

Preferably, the device is also arranged to receive information via a data link about a payment made for selected goods and, in particular, to only grant the release after receipt of this information. Such a payment can be made using the above-mentioned computing unit, which is also used to select the goods. Payment options can be any type of known or existing payment options, such as those used for purchases over the Internet. This allows for a payment particularly convenient and fast payment. In addition, the time the customer spends at the device is then shorter.

It should be noted that one device can support both ways of selecting and paying for goods, i.e. both selection and payment at the device itself and via a remote computing unit, for example via the Internet. It is also conceivable to combine both variants for a procedure for selection and payment of goods. For example, the goods can be selected via the data link (for example, from home), but then only be paid for at the device when the goods are picked up. In the same way, the goods can be selected at the device itself and then paid for via the data link, for example using the user's mobile phone. This provides a further method of payment.

It is particularly useful if the device is arranged to remove the selected goods from the storage areas by means of the handling system only after the release and then to provide them for removal in the at least one output device. This means that the goods are not only not provided for removal until the release (i.e. in particular payment or authentication), but they are also only removed from the storage areas after the release. This ensures, for example, that no goods are unnecessarily removed from a deep-freeze area if it is not yet certain that the goods will be paid for or picked up. In the case of selection and payment via the remote computing unit, it is in particular also ensured that goods to be cooled remain cooled until they are picked up. In addition, a further dispensing process can also be carried out in the time until collection, as neither the handling system nor the output device is blocked.

Advantageously, at least one of the at least two storage areas has several storage compartments for the goods arranged next to and/or above one another. This allows to keep ready as many different goods as possible, in particular with regard to weight and/or size.

It is particularly useful if the storage compartments are each assigned an actuating device for moving goods within the respective storage compartment, which is part of the handling system. On the one hand, this makes it particularly easy to remove the goods from the storage compartments, but on the other hand, the storage compartments can also be designed to be particularly large or deep such that they can hold a particularly large number of goods.

It is also advantageous if the handling system has at least one handling device assigned to one of the storage areas, which in turn has a receiving area, in particular a container, which can be positioned in relation to each of the storage compartments of the associated storage area in such a way that goods can be placed or brought into the receiving area from the respective storage compartment. Such a handling device can then, for example, be positioned at the corresponding storage area, then the receiving area can be moved in front of the desired storage compartment (both in the horizontal direction and in the vertical direction). Then, by means of the actuating device, goods can be brought from the corresponding storage compartment into the receiving area. In the same way, further goods can be brought into the receiving area from other storage compartments. By means of the receiving area, the goods brought into the receiving area can then also be brought into the output device for removal, for example.

In this context, it should also be mentioned that the individual storage areas, in particular those which are cooled, may be closed, for example by doors, in particular automatically operated doors, which are only opened when goods are to be removed by means of the handling system.

Preferably, the handling system may also include at least one transportable container into which goods taken from the corresponding storage area can be placed and by means of which the goods placed therein can be provided in the output system. Such a transportable container, into which the goods are then transferred from the receiving area, may be provided in addition to the aforementioned receiving area. The goods can then be brought to the output device by means of the transportable container. In this way, the handling devices need only be movable in the area of the storage areas.

It is however also conceivable that no handling devices having the above-mentioned receiving areas are provided, but only the transportable containers into which the goods are placed—for example, by means of the above-mentioned actuating device.

Furthermore, it is preferred if goods can be removed from the corresponding storage area by means of the handling system and can be directly provided without intermediate storage in the output device. In this case, the handling system can be designed as a robot or similar, or include a robot which can, for example, remove the goods individually from the storage areas and transfer them directly to the output device.

It is also particularly preferred if the handling system has at least two, preferably at least three handling devices assigned to different storage areas. The handling devices can then, for example, each be designed as described above. In this way, several goods can be removed at the same time, which speeds up the provision.

Preferably, the output device also has at least two, in particular at least three, output areas, in particular output compartments, which are each assigned to different storage areas. In combination with the two or three handling devices, for example, this can further accelerate the provision Apart from this, and also independently of the number of handling devices, a separation of the goods according to the temperatures of the storage areas can be achieved, i.e. frozen food and goods that do not require cooling are provided separately in the output device, for example.

It is also particularly advantageous if the device is further arranged to check whether all selected goods are ready for removal in the output device. This ensures that each selected and paid for item is finally provided to the customer for removal and is not lost during or after removal from the storage area or does not reach the output area. This can be done, for example, by scanning a code provided on the respective goods during or immediately after removal from the storage area or when they are brought into the aforementioned receiving area. However, it is, for example, also particularly useful to check the weight of goods present in such a receiving area and, in particular, the change of weight after removal of goods. For example, an increase in weight means that goods have been brought onto or into the receiving area. Exact weight information is not absolutely necessary for this purpose, as only the change in weight is important.

It is particularly preferred if the device is placed in a container, especially an ISO container. In this way, the device is transportable and can be placed in a suitable location as required, for example in a parking lot of a supermarket. Alternatively, however, it is also preferable if the device is adapted for installation in a building or is installed in a building. This could be, for example, in a building of a supermarket. In this case, only the output device and, if applicable, the selection or payment device must be accessible to a user from outside.

Regardless of the specific design of the device, however, it must be ensured that the individual storage areas can be refilled with goods. In the case of a container, for example, the storage areas may only be arranged in the middle area so that they can be refilled from the outside. Accordingly, a door must be provided in the container, through which an employee can enter the container.

It should also be noted that a storage area can also be divided into several sub-areas. For example, it is conceivable to have a sub-area with ambient temperature, but which is arranged especially for beverage bottles as goods, possibly also with a separate handling device. Two (or more) handling devices can also be provided for one storage area. In this context, however, it is also conceivable to provide a further storage area with a different temperature.

Furthermore, subject of the invention is a system having at least one device according to the invention and having a computing unit connected to the at least one device via a respective data link and remote from the at least one device. The remote computing unit may in particular be a computer or a smartphone. It is particularly preferred if the system has at least two such devices. It is also preferred if the system has a further computing unit to which the at least one device and the remote computing unit are connected via a respective data link. The further computing unit can in particular be a central computing unit such as a server.

Furthermore, subject of the invention is a method for operating at least one device or system according to the invention. In this method, selected goods to be removed from the storage areas are determined, wherein the selected goods are removed from the corresponding storage areas by means of the handling system and are provided for removal in the output device after receipt of the release.

In particular, the selected goods can be determined on the device using the selection device. Alternatively, it is preferable if the selected goods are determined using a computing unit connected to the device via the data link and remote from the device.

With regard to a more detailed description as well as further advantages and design of the system as well as the method, reference is made here to the previous remarks on the device according to the invention, which apply accordingly.

It is also particularly preferred if the method is used to operate a system of the invention having at least two devices with the data link mentioned. In this case, goods to be selected are determined using the remote computing unit. Of the at least two devices, one device is selected on the basis of at least one criterion, to which device the determined goods are assigned as selected goods. This selected device can then be used as mentioned above. The selection of the device in question together with the processing of necessary data can be carried out, for example, by a further computing unit, as already mentioned.

Such a criterion is, in particular, whether all the selected goods (in particular by a user) are present in the device in question, or at least whether as many of them as possible are present. A further criterion would be, for example, the distance of the device in question from the user or his/her current location. Thus it is also conceivable, for example, that after the selection of the desired goods on a remote computing unit by a user, it is determined which device holds all selected goods and is closest to the user by using the mentioned further computing unit. In this context, it is also conceivable that this device is then first notified to the customer, for example also displayed on a map, possibly together with its distance. The user can then be given the opportunity to pay for the goods. It is then also conceivable that the user selects a closer device, which then does not hold all the selected goods. In other words, the selection of goods can be adjusted.

Also, the implementation of the method in the form of a computer program is advantageous, since this causes particularly low costs, especially if an executing device or an executing computing unit is further used for other tasks and therefore exists anyway. Suitable data carriers for the provision of the computer program are in particular magnetic, optical and electrical memory devices, such as hard disks, flash memories, EEPROMs, DVDs, etc. It is also possible to download a program via computer networks (Internet, Intranet etc.).

Further advantages and features of the invention can be found in the description and the enclosed drawing.

It goes without saying that the features mentioned above and those to be explained below can be used not only in the combination indicated in each case, but also in other combinations or on their own, without leaving the scope of the present invention.

The invention is shown schematically in the drawing by means of an exemplary embodiment and is described in the following with reference to the drawing.

DESCRIPTION OF THE FIGURES

FIGS. 1 to 4 show a device 100 in a preferred embodiment according to the invention. The device 100 is used for the sale of goods and is formed as a container. In the following, FIGS. 1 to 4 will be described in a comprehensive manner.

FIG. 1 shows a section in top view, FIG. 2 a section in perspective view, FIG. 3 a sectional view from one of the sides and FIG. 4 a perspective exterior view.

Device 100 has—inside the container—three different storage areas 111, 112 and 112, in which goods can be stored and which can each be set or adjusted to a temperature that is different from the temperature in the other two storage areas. For example, the storage area 111 has a temperature of −21° C., the storage area 112 has a temperature of 6° C., and the storage area has a temperature of +21° C. The temperatures can of course also have other values, and in particular lie within the temperature ranges already mentioned above. In order to be able to set or adjust the above-mentioned temperatures and then maintain them, an appropriate cooling device can be provided, as shown with the reference symbol 105.

The energy supply can be a connection to a power supply network, or a self-sufficient energy supply with photovoltaic cells and an energy storage device on or in the container, for example.

With the temperatures stated, in particular three different climatic zones can be maintained, namely a deep-freeze area, a fresh food area and an area which is not refrigerated or at least not strongly refrigerated, in which correspondingly goods which require cooling or which do not require cooling, in particular food, can be kept.

Figure 1:
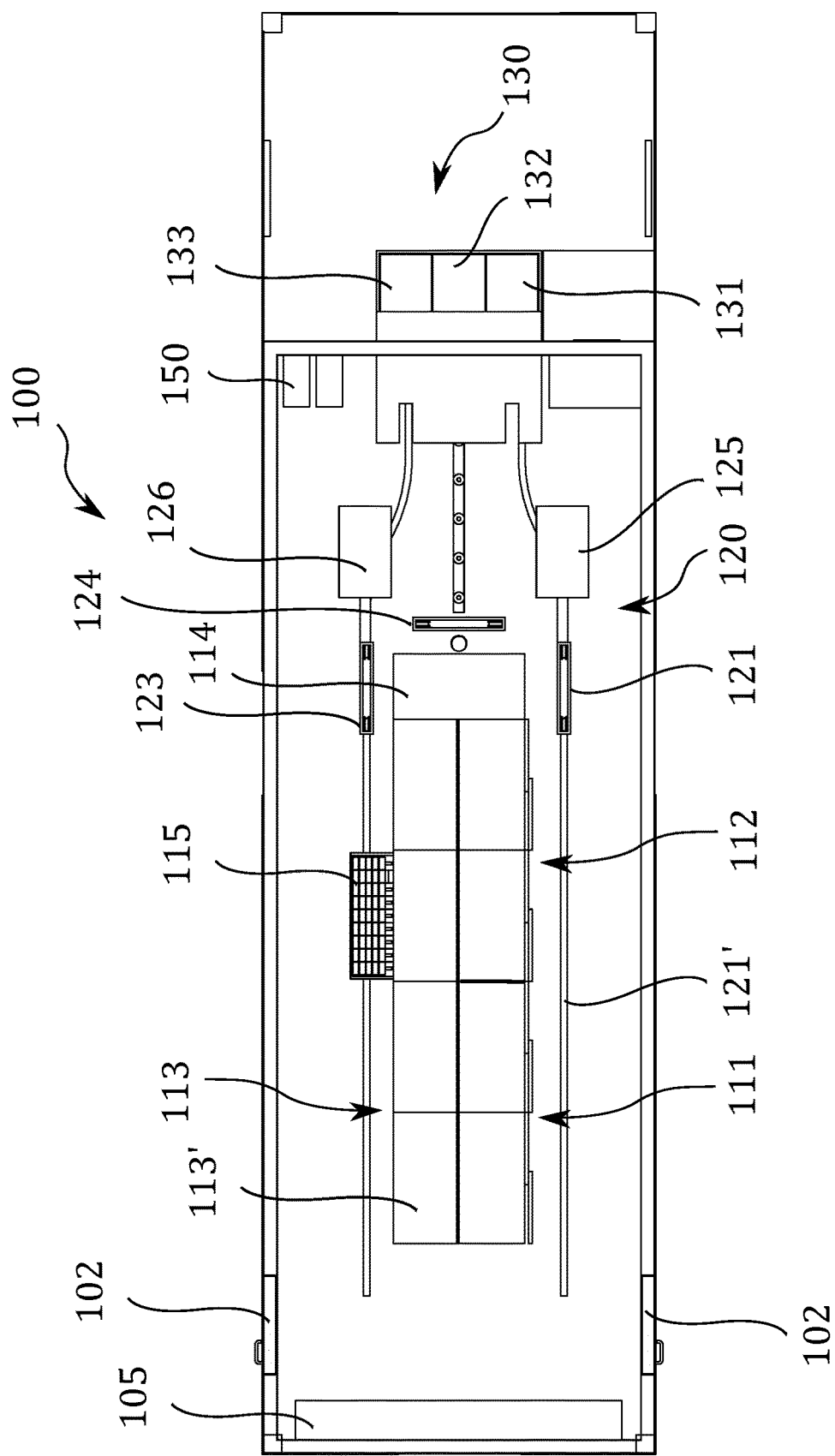
FIGS. 1 to 4 show a device according to the invention in a preferred embodiment in different views.

Storage areas 111, 112 and 113 themselves each have several sub-areas, of which, for example, one sub-area 113' of storage area 113 is marked with a reference sign as shown in FIG. 1. Storage areas 111 and 112 each have two subareas, storage area 113 has four such subareas. In each subdivision there are several storage compartments 115, as shown in FIG. 1. Such storage compartments, which are provided in particular one above the other and—within a storage area—also next to each other, are used for storing or holding goods. For filling, such trays 115, as also shown in FIG. 2, can be pulled out of the storage area, for example.

The individual storage areas can be of different sizes according to requirements, so that a desired quantity of goods can be kept within them. In the shown example, a further subarea 114 is also provided as part of storage area 113, in which, for example, drinks or bottles can be stored as goods. It is also conceivable that a subarea of one of the other storage areas is selected or that an additional storage area is used.

Figure 2:
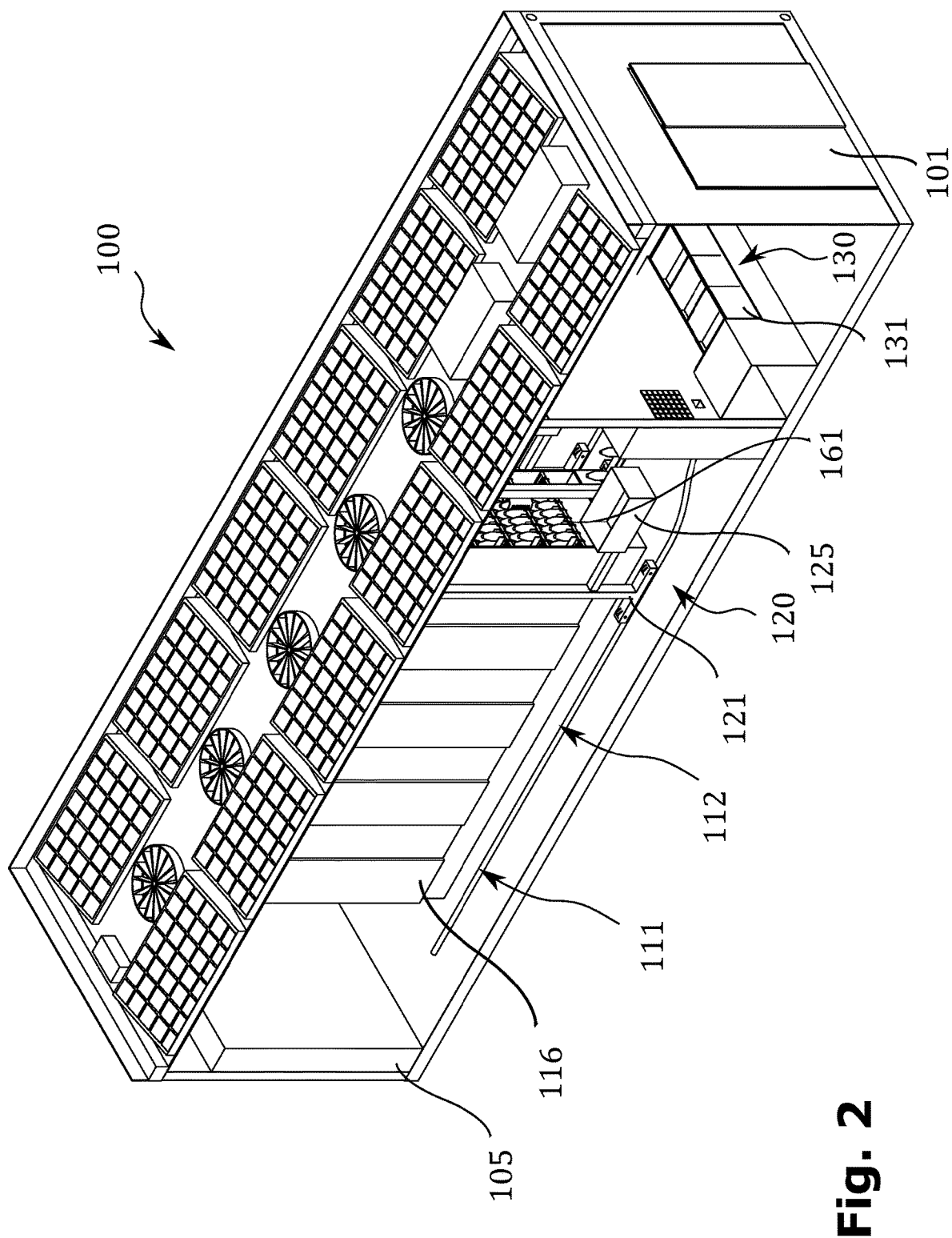

Furthermore, FIG. 2 shows doors 116, which can be used to close the storage areas. This is particularly relevant for refrigerated storage areas in order to save energy. In particular, such doors can be opened and closed automatically, as will be explained in more detail below.

In FIGS. 1 and 2 in particular, it is also apparent that the storage areas are only provided in the middle of the container, i.e. there is a free area between the storage areas and a respective wall of the container, so that a person can enter to fill goods into the storage areas. Two lockable doors 102 are provided for entering the container, for example. In addition, this free area is intended for a handling system 120, which will be explained in more detail below.

The handling system 120 is used to remove the goods from the individual storage areas or the storage compartments provided therein and to transfer them to a output device 130. In the exemplary embodiment shown, the handling system 120 comprises three separate handling devices 121, 123 and 124. Handling device 121 is assigned to storage areas 111 and 112, handling device 123 to storage area 113 and handling device 124 to subarea 114.

The handling devices 121 and 123 each have a receiving area 125 and 126 respectively, which in this case are formed as containers. The handling devices 121 and 123 can be moved along rails, one of which is marked with the reference sign 121', along the assigned storage areas. With regard to the removal of goods from the storage areas, reference is also made to FIG. 5 and the corresponding description.

The handling device 124, which is assigned to subdivision 114, may, for example, have a gripper by means of which goods formed as bottles 161 can be removed from subdivision 114.

Each of the above-mentioned handling devices is further equipped to transfer the goods removed from the storage areas into or to the output device 130, where the goods can then be removed by a person.

In the exemplary embodiment shown, the output device 130 has three output areas or output compartments 131, 132 and 133. The receiving area 125 of the handling device 121 can be brought into the output compartment 131, and the receiving area 126 of the handling device 123 can be brought into the output compartment 133. For this purpose, suitable openings, which can be closed if necessary, can be provided in the corresponding wall. In this way, goods can then be removed by a person.

The handling device 124 can, for example, be arranged to place the mentioned bottles individually into the output compartment 132. These can then also be removed by a person. It is also conceivable in this context that the openings of the receiving compartments, through which a person can remove the goods, remain closed at first by means of a lid or the like and are only opened when required or when released, as will be explained in more detail later.

Figure 3:
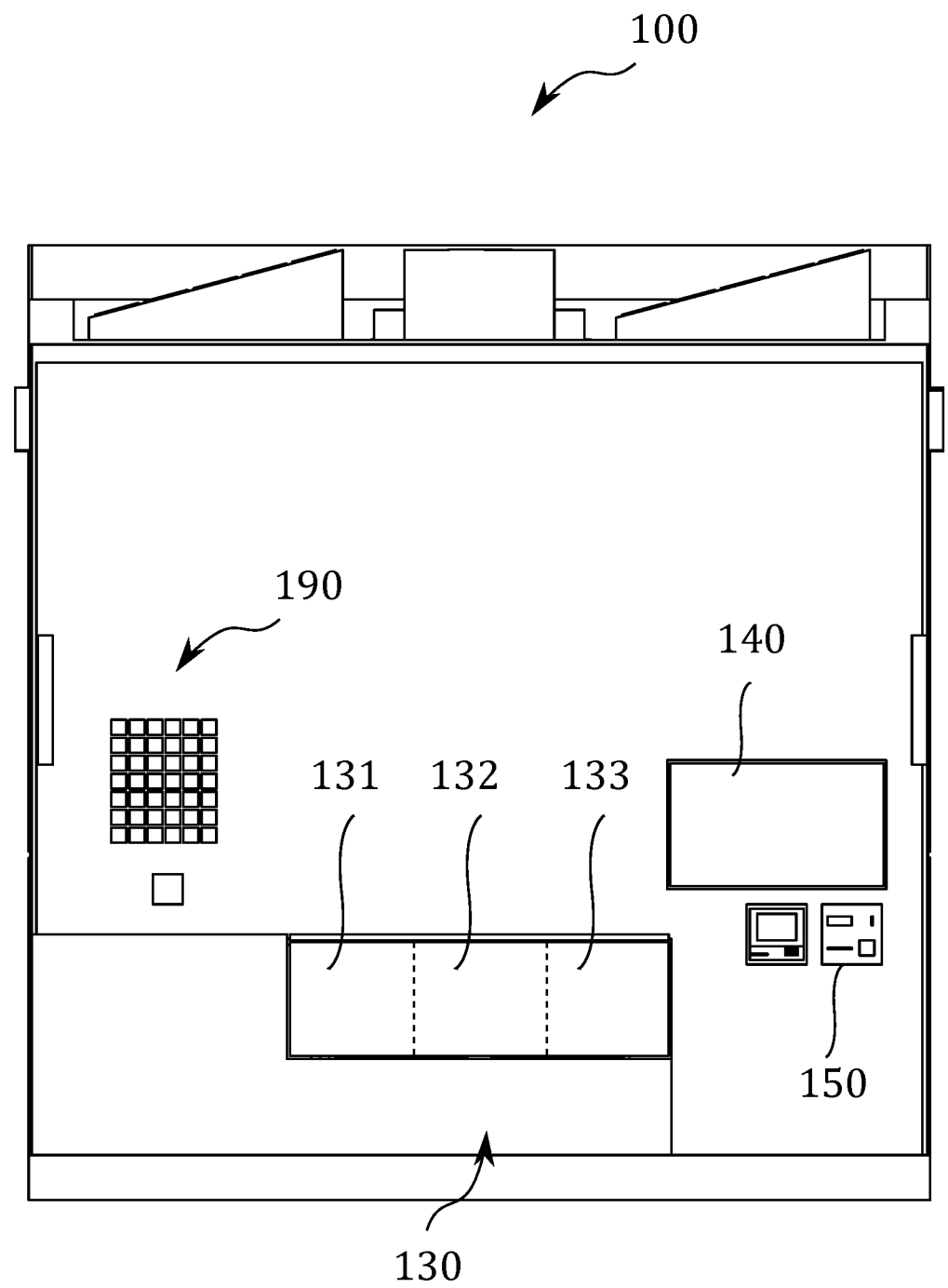
Figure 4:
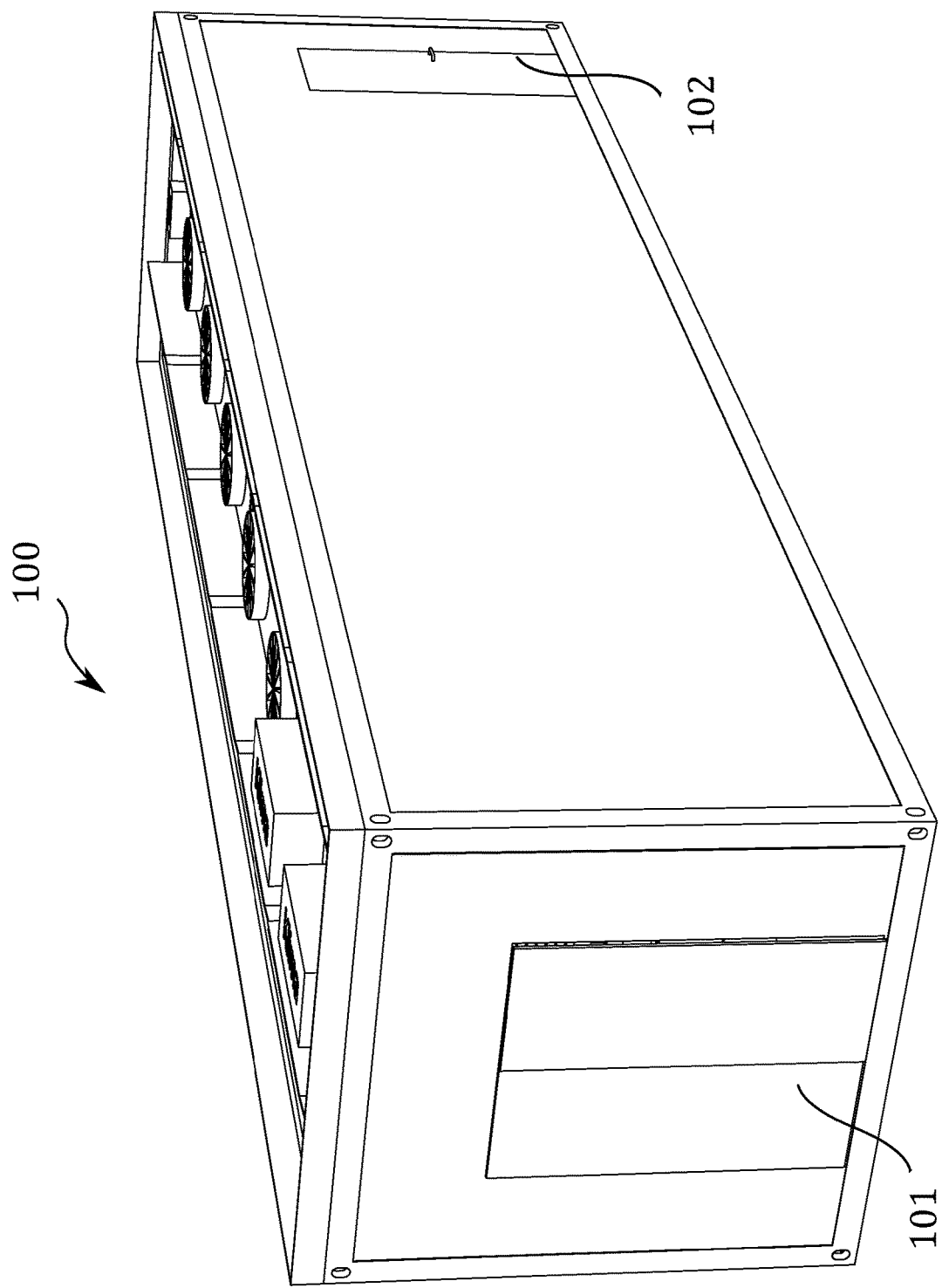

Furthermore, a selection device 140, which is particularly equipped with a display and/or input means, is provided. This may in particular be a touch screen or the like. As can be seen in FIG. 3, this selection device 140 is located next to the output device and can be reached by a person or a user—like the output device—through a door 101 in the device 100.

By using the selection device 140, for example, the goods available in the device can be displayed and selected by the person. Furthermore, a payment device 150 is provided below the selection device 140, with which the selected goods can be paid for by the person.

In particular, the device is arranged in such a way that a person selects desired goods using the selection device 140 and then pays using the payment device 150. Then, using the handling system 120, the selected goods are removed from the storage areas, as explained above, and provided for the person for removal in the output device 130. In particular, the device is arranged so that a release for picking the goods and providing them at the output device is only issued after payment has been made.

Figure 5:
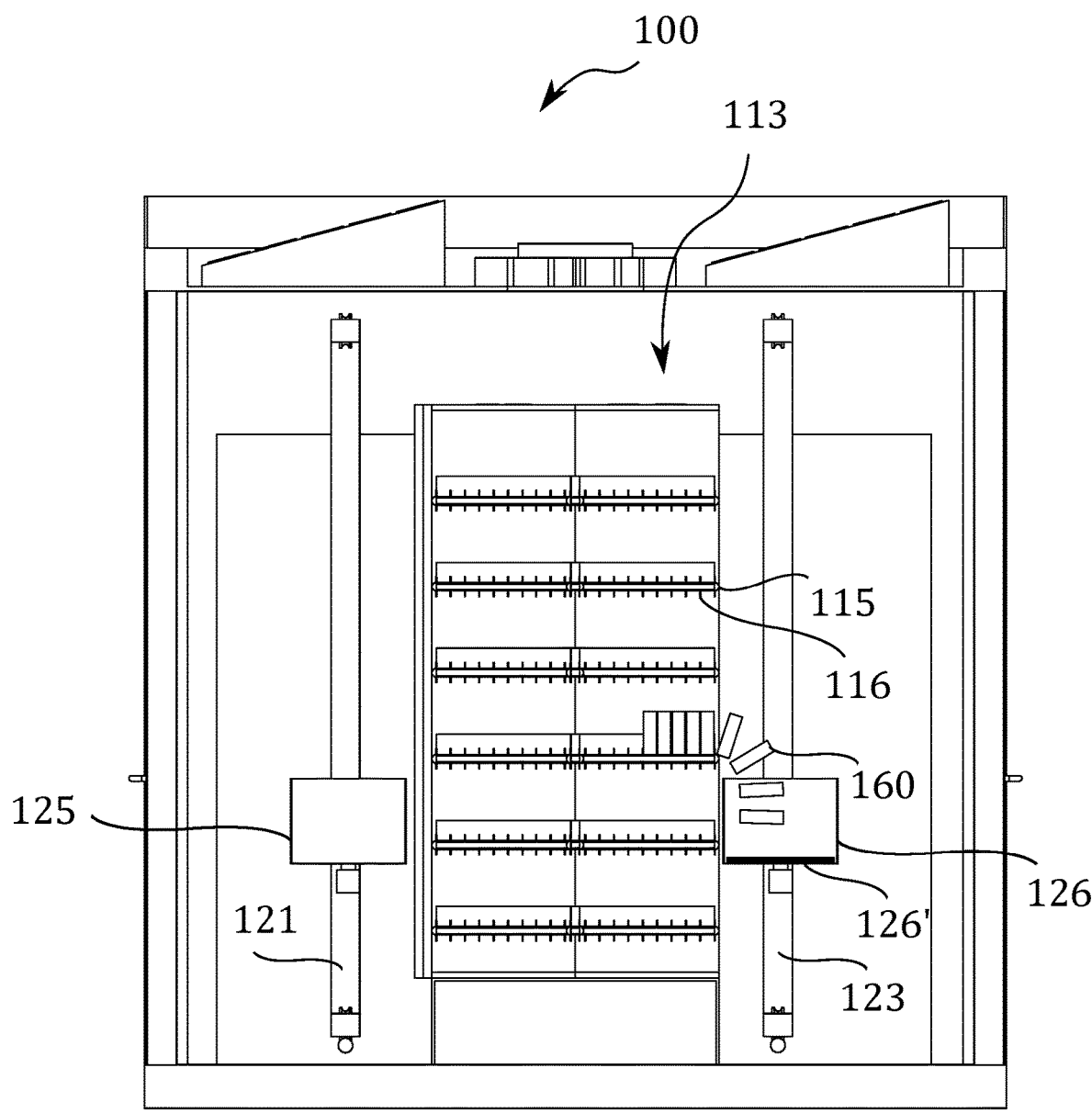
FIG. 5 shows a part of a handling system of the device of FIGS. 1 to 5 in a more detailed view.

FIG. 5 shows a sectional view through the device 100 and the storage area 113. This is intended to explain the handling system in more detail in the following, as already mentioned, particularly with regard to the removal of the goods.

As already mentioned, the handling device 123, which is part of the handling system, can be moved in such a way that the receiving area or the container 126 is positioned in front of one of the storage compartments 115. For this purpose, the container 126 can also be moved in the vertical direction in particular.

In addition, an actuating device 116 is assigned to each storage compartment 115, which can be formed as a revolving belt or similar. This allows the goods 160 to be moved out of the storage compartment 115 and to be placed in the container 126 by dropping them. For this purpose, it may be necessary to open the aforementioned door of the corresponding storage area.

Furthermore, the device 100 is arranged to check whether all selected goods are provided for removal in the output device. For this purpose, the exemplary shown scale 126', which is integrated in the bottom of container 126, can be used. If a new good falls into container 126, the weight recorded by the scale increases. In this way, it can be ensured that the goods in question have also landed in the container and have not fallen off. If necessary, new goods could then be removed.

Figure 6:
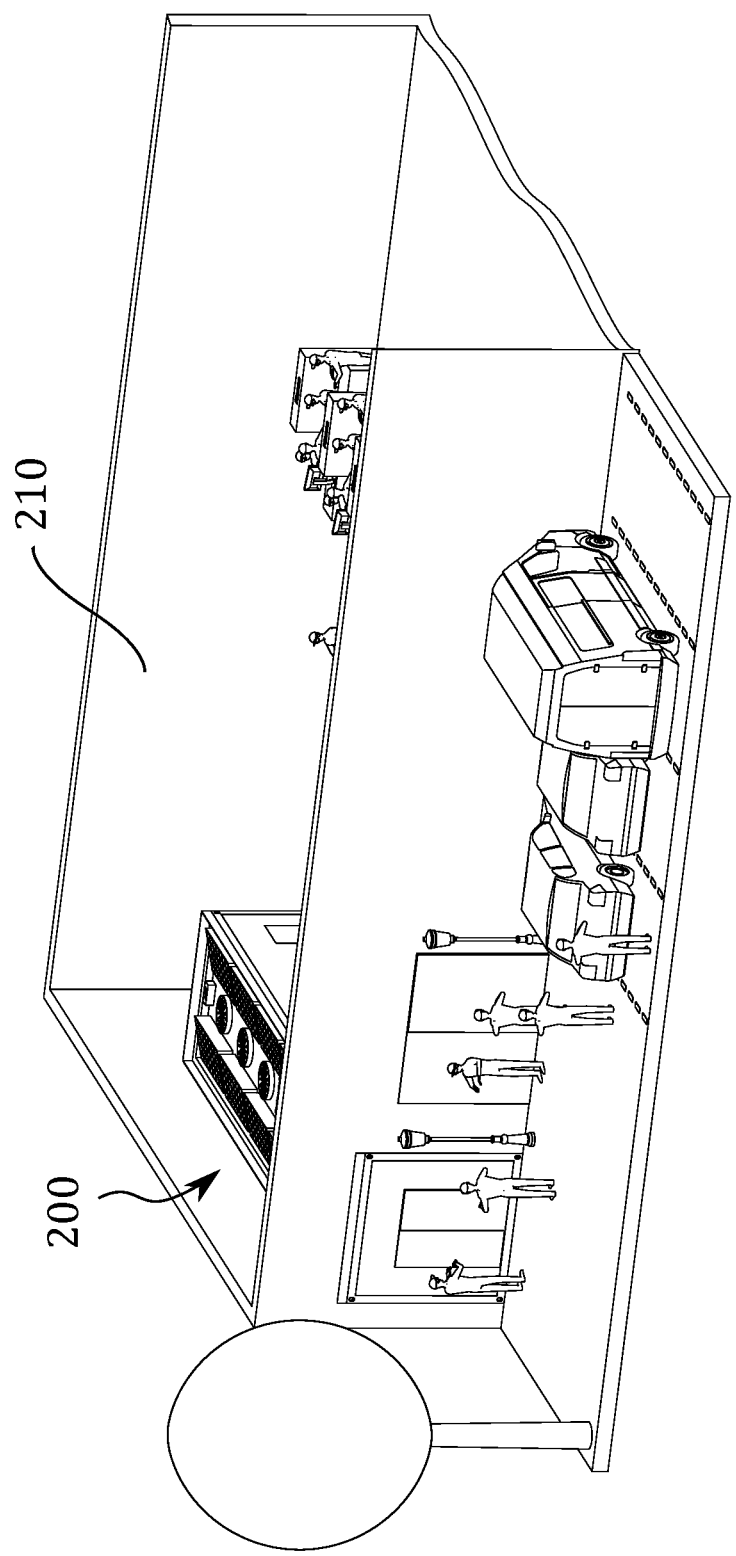
FIG. 6 shows a device according to the invention in another preferred embodiment.

FIG. 6 shows a device 200 according to the invention according to another preferred embodiment. The device 200 is likewise used for the sale of goods and is installed in a building 210. In such a building 210, for example, a supermarket may be provided.

It is conceivable in this context to provide the necessary components of device 200—as with device 100—in a container, whereby the container is then formed so that it can be installed or integrated in the building. However, it is understood that the necessary components of the device can also be provided in a building without such a container.

Apart from that, the device 200 can be formed similar to the 100 device; therefore, reference is made to the latter for a more detailed description.

Figure 7:
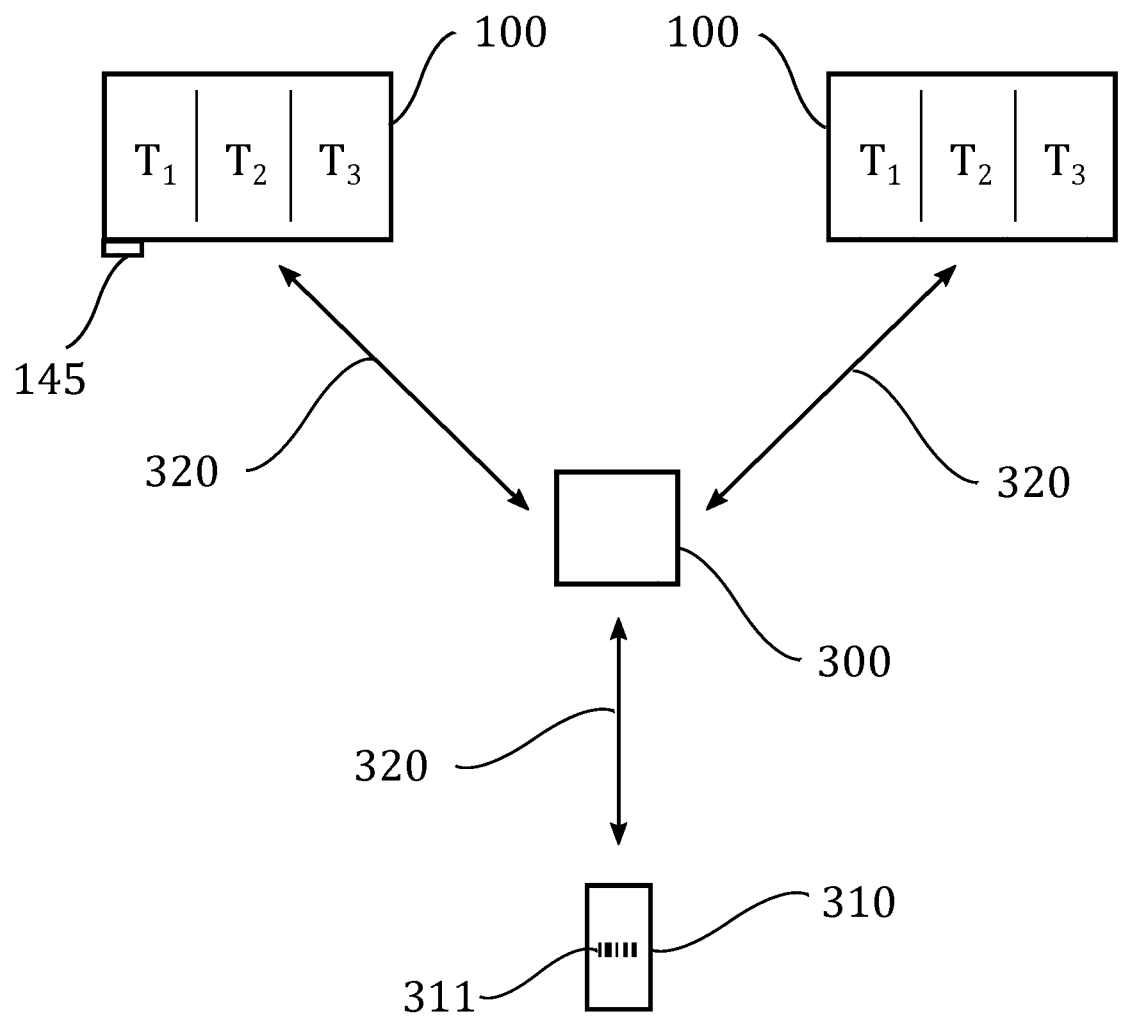
FIG. 7 shows an arrangement or system having two devices with which a method according to the invention can be carried out according to a preferred embodiment.

FIG. 7 shows a schematic diagram of an arrangement with two devices 100, by means of which a method and a system according to the invention, each in a preferred embodiment, shall be explained.

The two devices 100, in each of which the different temperatures T1, T2 and T3 are shown, for example, are each connected to a central computing unit 300 via a data link 320. The central computing unit 300 in turn is connected via a further data link 320 to another computing unit 310 which is remote from the devices. The additional computing unit 310 can be a smartphone or the like, on which a corresponding application or app is stored.

By using the smartphone 310 and the corresponding app, a user can select, for example, desired goods that he or she would like to buy. The goods determined in this way are then transmitted to the central computing unit 300. There it is then determined in which of the two devices 100 all the desired goods or at least most of the desired goods are available, and/or the location of which of the devices 100 is closest to the user's or the smartphone's location.

The user is then informed of the relevant device on the 310 smartphone and can decide whether to buy the goods and collect them from the device in question.

After the goods have been paid for, in particular also using the smartphone, the selected goods are blocked or reserved in the relevant device. On the smartphone, the user is then shown a code 311, for example, which he or she can have read on the device using the reader 145. Once authentication has been completed, the release is granted to remove the selected goods and provide them for removal, as explained above.

It goes without saying that in this way other devices can also be included in the method and that other suitable criteria can also be used for selecting a device.

The invention claimed is:

1. A sale device (100, 200) for the sale of goods (160, 161), having at least two storage areas (111, 112, 113) in each of which a temperature (T1, T2, T3) different from the other storage areas can be set and/or adjusted in a respectively associated temperature range, and which are each arranged for the storage of goods (160, 161), having an automated handling system (120) by means of which goods (160, 161) can be removed from each of the storage areas (111, 112, 113), and having a output device (130) in which goods (160, 161) can be provided for removal, wherein the sale device (100, 200) is arranged to remove selected goods (160, 161) from the storage areas (111, 112, 113) by means of the handling system (120) and, after a release, to provide them for removal in the output device (130), wherein the handling system (120) comprising at least two handling devices (121, 123, 124) associated with different ones of the storage areas (111, 112, 113), such that several goods from at least two different storage areas (111, 112, 113) can be removed at the same time.

2. The sale device (100, 200) according to claim 1, wherein the output device (130) comprises at least two output areas (131, 132, 133) associated with different ones of the storage areas (111, 112, 113).

3. The sale device (100, 200) according to claim 1, which is further arranged to check whether all selected goods (160, 161) are provided for removal in the output device (130).

4. The sale device (100, 200) according to claim 1, which is placed in a container, in particular an ISO container, or which is arranged for installation in a building (210) or is installed in a building (210).

5. A system having at least one sale device (100, 200) according to claim 1 and having a computing unit (310) connected to the at least one sale device (100, 200) via a respective data link (320) and remote from the at least one sale device (100, 200), and in particular having a further computing unit (300) to which the at least one sale device (100, 200) and the remote computing unit (310) are connected via a respective data link (320).

6. The sale device (100, 200) according to claim 1, wherein the temperature ranges of the storage areas (111, 112, 113) comprise a temperature range of −30° C. to 0° C., and/or a temperature range of 0° C. to +10° C., and/or a temperature range having ambient temperature or from +10° to +25° C.

7. The sale device (100, 200) according to claim 1, having at least three storage areas (111, 112, 113).

8. The sale device (100, 200) according to claim 1, which is arranged to remove the selected goods (160, 161) from the storage areas (111, 112, 113) by means of the handling system (120) only after the release and then to provide them for removal in the output device (130).

9. The sale device (100, 200) according to claim 1, which is further arranged to receive information via a data link (320) about a payment for selected goods that has been made, and in particular to only grant the release after receipt of this information.

10. The sale device (100, 200) according to claim 1, further having a selection device (140), in particular with a display and/or input means, by means of which the goods to be removed from the storage areas (111, 112, 113) can be selected.

11. The sale device (100, 200) according to claim 1, further having a payment device (150) by means of which the selected goods can be paid for, wherein the sale device (100, 200) is in particular arranged to only grant the release after payment has been made.

12. The sale device (100, 200) according to claim 1, which is further arranged to receive information via a data link (320) about selected goods (160, 161) to be removed from the storage areas (111, 112, 113), and which is in particular further arranged to block the goods to be removed according to the information received via the data link (320) for a further selection.

13. The sale device (100, 200) according to claim 12, which is further arranged to grant the release only after an authentication, in particular by means of a code (311).

14. A method for operating at least one sale device (100, 200) according to claim 1, wherein selected goods (160, 161) to be removed from the storage areas (111, 112, 113) are determined, and
- wherein the selected goods are removed from the corresponding storage areas (111, 112, 113) by means of the handling system (120) and are provided for removal in the output device (130) after receipt of the release.

15. The method according to claim 14, wherein the sale device (100, 200) further has a selection device (140), in particular with a display and/or input means, by means of which the goods to be removed from the storage areas (111, 112, 113) can be selected, and wherein the selected goods (160, 161) are determined using the selection device (140) on the sale device (100, 200).

16. The method according to claim 14, wherein the selected goods are determined using a computing unit (310) connected to the sale device (100, 200) via a data link (320) and remote from the sale device (100, 200).

17. The method according to claim 14, for operating a system having at least two sale devices (100, 200), said system having a computing unit (310) connected to the at least two sale devices (100, 200) via a respective data link (320) and remote from the at least two sale devices (100, 200), wherein goods (160, 161) to be selected using the remote computing unit (310) are determined,
- wherein, of the at least two sale devices (100, 200), one sale device (100, 200) to which the determined goods (160, 161) are assigned as selected goods is selected on the basis of at least one criterion.

18. A computer program that causes a device or system to perform a method according to claim 14 when executed on the device or system.

19. A machine readable storage medium having a computer program according to claim 18 stored thereon.

* * * * *